US010761066B2

(12) United States Patent
Na et al.

(10) Patent No.: US 10,761,066 B2
(45) Date of Patent: Sep. 1, 2020

(54) MICRO-RESOLUTION ULTRASONIC NONDESTRUCTIVE IMAGING METHOD

(71) Applicant: WYLE LABORATORIES INC., Houston, TX (US)

(72) Inventors: Jeong K. Na, Dayton, OH (US); Shaun L. Freed, Mead, CO (US); Erin K. Oneida, Dayton, OH (US)

(73) Assignee: KBR WYLE Services, LLC, Houston, TX (US)

( * ) Notice: Subject to any disclaimer, the term of this patent is extended or adjusted under 35 U.S.C. 154(b) by 285 days.

(21) Appl. No.: 15/631,901

(22) Filed: Jun. 23, 2017

(65) Prior Publication Data
US 2017/0370885 A1 Dec. 28, 2017

Related U.S. Application Data

(60) Provisional application No. 62/493,142, filed on Jun. 24, 2016.

(51) Int. Cl.
*G01N 29/04* (2006.01)
*G01N 29/06* (2006.01)
(Continued)

(52) U.S. Cl.
CPC ....... *G01N 29/0681* (2013.01); *G01N 29/043* (2013.01); *G01N 29/069* (2013.01);
(Continued)

(58) Field of Classification Search
CPC ................ G01N 29/26–275; G01H 9/00–008
See application file for complete search history.

(56) References Cited

U.S. PATENT DOCUMENTS

| 3,505,859 A | * | 4/1970 | Byers | G01N 29/26 73/600 |
| 3,645,129 A | * | 2/1972 | Grant | G01H 9/00 73/588 |

(Continued)

FOREIGN PATENT DOCUMENTS

| GB | 2222678 A | * | 3/1990 | ............. G01N 29/11 |
| GB | 2495378 A | * | 4/2013 | |

OTHER PUBLICATIONS

Mallet, L., et al. "Structural health monitoring using scanning laser vibrometry: II. Lamb waves for damage detection." Smart Materials and Structures 13.2 (2004): 261.*

(Continued)

*Primary Examiner* — Alexander A Mercado
(74) *Attorney, Agent, or Firm* — Gary M. Machetta

(57) ABSTRACT

A system and methods of nondestructive testing are described. The system includes an immersion ultrasonic probe and a laser vibrometer. The immersion ultrasonic probe and a sample are immersed in a fluid contained in an immersion tank and the laser vibrometer is disposed outside of the immersion tank. A tightly focused ultrasonic beam from the immersion ultrasonic probe and a laser beam from the laser vibrometer are both transmitted upon a sample, the laser beam being transmitted through the wall of the immersion tank. Since the ultrasonic beam is tightly focused and the laser beam samples only a small area impinged by the ultrasonic beam, microscopic resolution is obtained.

11 Claims, 13 Drawing Sheets
(7 of 13 Drawing Sheet(s) Filed in Color)

(51) Int. Cl.
 *G01N 29/22* (2006.01)
 *G01N 29/265* (2006.01)
 *G01N 29/28* (2006.01)
 *G01N 29/24* (2006.01)

(52) U.S. Cl.
 CPC ....... *G01N 29/0645* (2013.01); *G01N 29/221* (2013.01); *G01N 29/225* (2013.01); *G01N 29/2418* (2013.01); *G01N 29/2437* (2013.01); *G01N 29/265* (2013.01); *G01N 29/28* (2013.01); *G01N 2291/0289* (2013.01)

(56) References Cited

U.S. PATENT DOCUMENTS

| | | | | |
|---|---|---|---|---|
| 4,035,839 | A * | 7/1977 | Eggleton | A61B 8/0875 73/618 |
| 4,083,232 | A * | 4/1978 | Heyser | A61B 8/0875 73/618 |
| 4,350,045 | A * | 9/1982 | Chow | G10K 11/352 367/120 |
| 4,366,713 | A * | 1/1983 | Gilmore | G01N 29/11 73/588 |
| 4,757,716 | A * | 7/1988 | Nottingham | F01D 21/003 73/623 |
| 4,768,155 | A * | 8/1988 | Takishita | B82Y 15/00 702/39 |
| 4,893,510 | A * | 1/1990 | Ichikawa | G01N 29/11 73/599 |
| 5,085,081 | A * | 2/1992 | Ohno | G01H 3/125 73/606 |
| 5,167,157 | A * | 12/1992 | Wertz | G01N 29/223 73/627 |
| 5,303,590 | A * | 4/1994 | Modderman | G01N 29/07 73/588 |
| 10,267,769 | B2 * | 4/2019 | Otter | G01N 29/024 |
| 2004/0056200 | A1 * | 3/2004 | Rothenfusser | G01N 25/72 250/341.1 |
| 2009/0249879 | A1 * | 10/2009 | Jeyaraman | G01N 29/0645 73/644 |
| 2013/0224791 | A1 * | 8/2013 | Taft | G01N 1/30 435/40.52 |
| 2014/0095096 | A1 * | 4/2014 | Na | G01N 25/72 702/81 |
| 2015/0128709 | A1 * | 5/2015 | Stewart | G01N 29/11 73/588 |

OTHER PUBLICATIONS

Roberto Longo et al., "Underwater visualization of multi-input interleaved multisine wavefronts for ultrasonic testing of bone specimens using laser Doppler vibronnetry," Proc. SPIE 7098, Eighth International Conference on Vibration Measurements by Laser Techniques: Advances and Applications, 70980T (Jun. 17, 2008).*

Wavelength and Defect Detection. Retrieved from https://www.nde-ed.org/EducationResources/CommunityCollege/Ultrasonics/Physics/defectdetect.htm. Accessed May 5, 2005.*

Olympus. (2011). Ultrasonic Transducers Technical Notes. Ultrasonic Transducers Technical Notes. Retrieved from http://www.olympus-ims.com/resources/white-papers/ultrasonic-transducer-technical-notes/.*

Guangzhi, Dai et al., "Super-Resolution Ultrasonic NDT Imaging System Based on Micro-Scanning," The 2nd International Conference on Information Science and Engineering, 2010, 4 pages.

Longo, Roberto et al., "Underwater Acoustic Wavefront Visualization by Scanning Laser Doppler Vibrometer for the Characterization of Focused Ultrasonic Transducers," Sensors, vol. 15, Aug. 13, 2015, pp. 19925-19936.

* cited by examiner

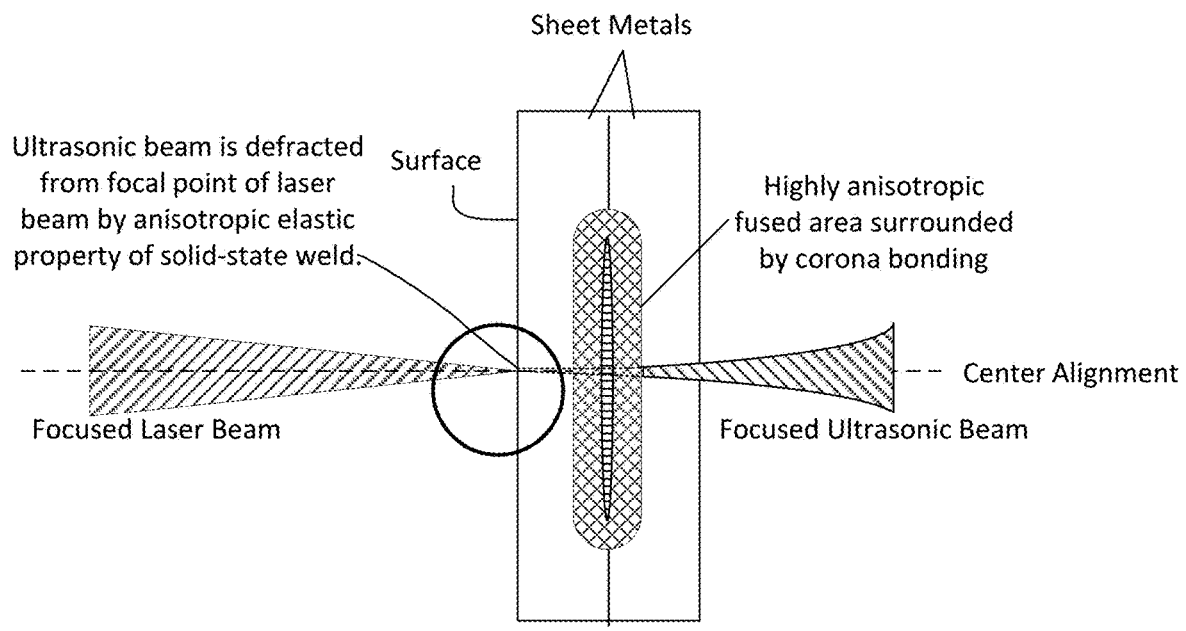
FIG. 10
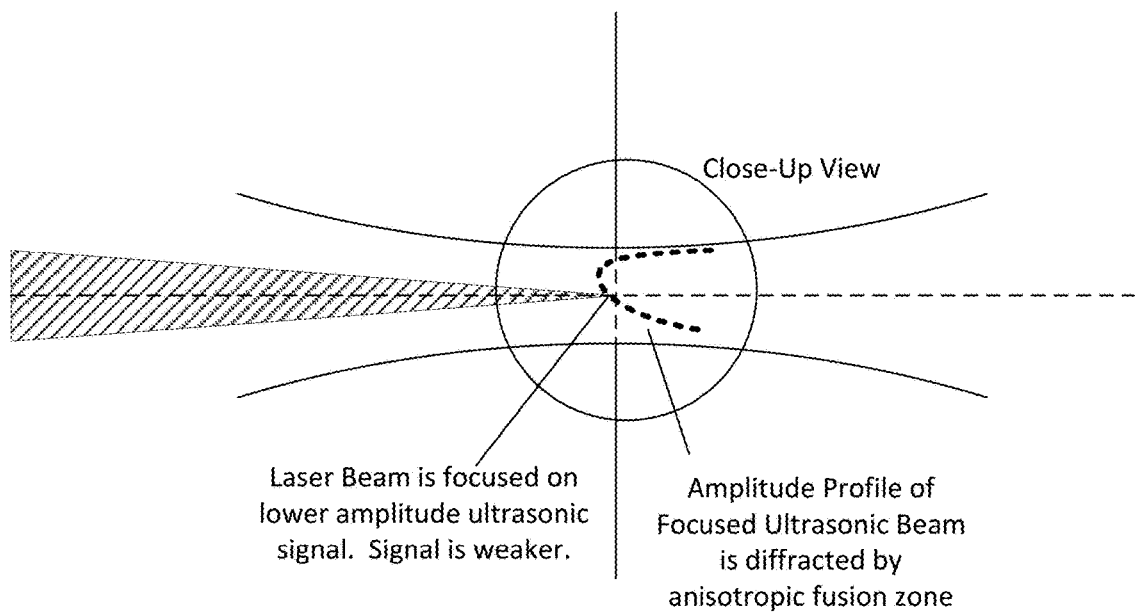

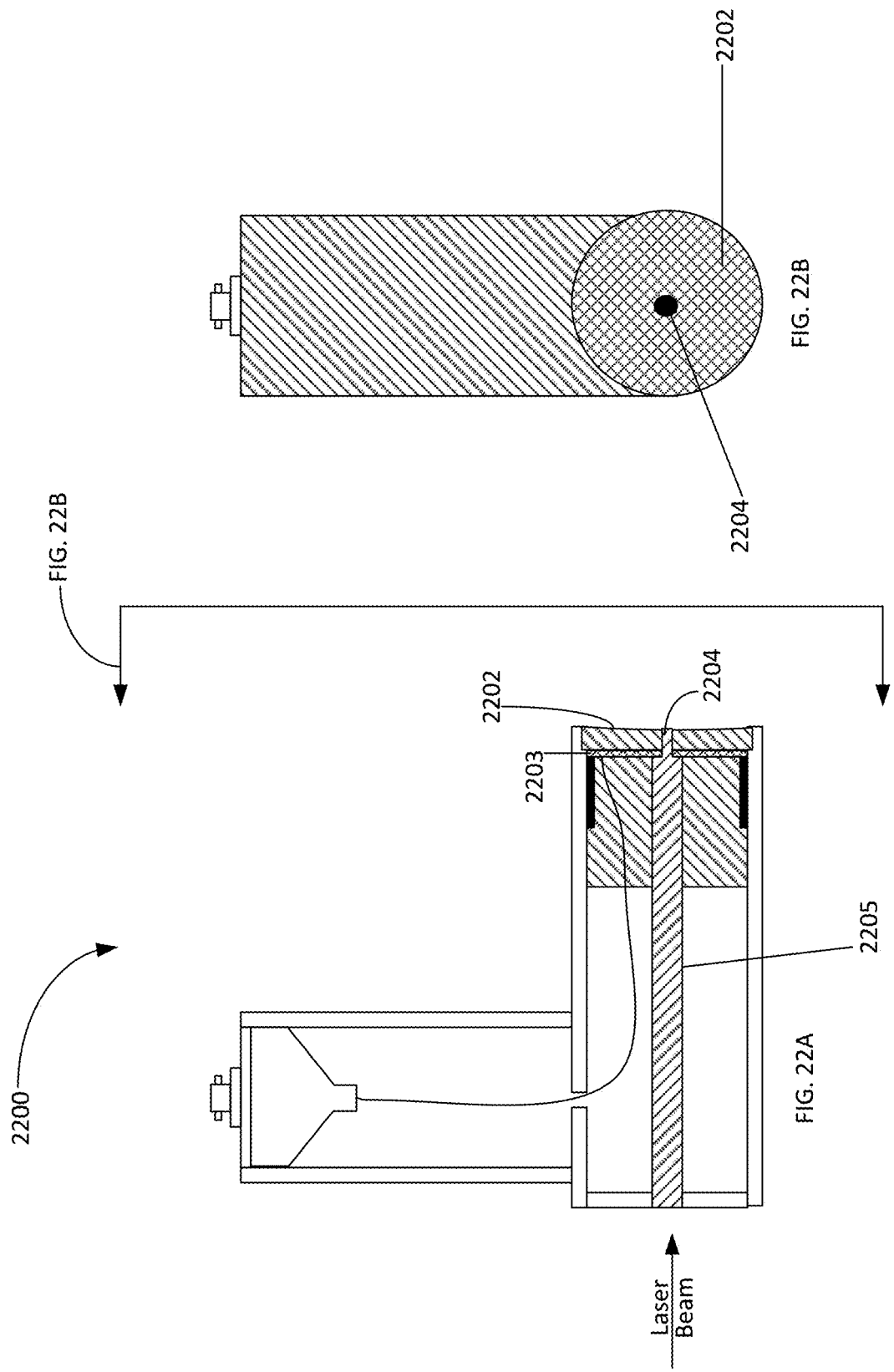

MICRO-RESOLUTION ULTRASONIC NONDESTRUCTIVE IMAGING METHOD

CROSS REFERENCE TO RELATED APPLICATIONS

The present application claims priority to U.S. Provisional Patent Application Ser. No. 62/493,142, filed Jun. 24, 2016, the contents of which are incorporated herein by reference.

FIELD OF THE INVENTION

This invention relates to a nondestructive testing (NDT) method for generating ultra-high resolution ultrasonic images of hidden flaws, defects and internal microstructural features. Particularly, this invention relates to the examination of internal joining conditions. Specifically, the invention relates to a new technique for generating microscopic resolution ultrasonic images containing internal features of fused joints of thin solid metal and non-metal plates. The invention is also further applicable to distinguish differences in microstructural features such as inclusions, microscopic pores, etc.

BACKGROUND

Ultrasonic testing is a type of non-destructive testing (NDT) whereby ultrasonic waves are propagated within the material or object to be tested. Defects or incongruities within the material may change the way that the ultrasonic waves are transmitted through the material or reflected off the material. Those changes in transmission/reflection are detected during ultrasonic testing, providing a diagnostic for defects within the material. Ultrasonic testing is often performed on steel and other metals and alloys, though it can also be used on concrete, wood and composites. It is used in many industries including steel and aluminum construction, metallurgy, manufacturing, aerospace, automotive and other transportation sectors.

Conventional ultrasonic imaging methods involve either an immersion or contact ultrasonic probe(s) to scan, mechanically or electronically, over an area of interest. There are two different sending and receiving modes; the pulse-echo and the pitch-catch. In the pulse-echo mode setup, a single ultrasonic probe is used to send and receive ultrasonic waves. In the case of pitch-catch mode, two ultrasonic probes are involved; one for sending and the other for receiving. In this case, both sending and receiving probes can be arranged to be on the same side of the test specimen or can be arranged to be on the opposite sides to each other. The later arrangement is often referred to as a "through-transmission mode" because the receiving probe detects only the transmitted part of ultrasonic waves through the test specimen.

Regardless of the setup mode used for a nondestructive testing, the received signals contain ultrasonic information about the beam scattering, diffraction and reflection that can occur inside of the test specimen in the form of amplitude variations and/or sound velocity changes when a burst of ultrasonic waves interacts with the internal features of the test specimen in an immersion setup. These variations in signals can be captured by a data acquisition unit and recorded on a computer along with the corresponding position data to generate a mapped image of the preprogramed scan area.

A mapped ultrasonic image over an area is called a C-scan ultrasonic image and is commonly used in a nondestructive testing process to visually represent and interpret the size and shape of the internal features after a scan is completed. This collective information via an imaging process makes it much easier to understand features of a test specimen rather than trying to interpret the electronic response signals of all data points (A-scan data). The visual quality of a C-scan image is determined by the spatial resolution used to take A-scan data, i.e. how small of scan step is used to move to the next data point. Each A-scan data represents a pixel in a C-scan image. This is a similar definition as the pixel size of a digital camera, where each scan step taken to collect an ultrasonic image corresponds to each pixel of the sensor in a digital camera. Again, the visual resolution of a final C-scan image depends on the step size of the scan. The smallest scan step that can be taken to collect ultrasonic A-scan data is limited by the accuracy and the resolution of the mechanical scanner used in an imaging system, which are typically a few micrometers for a high resolution translational stage.

In addition to the requirement of a fine scan step size to generate a high-resolution C-scan image, it is also desirable to have a highly concentrated ultrasonic beam over a small area to increase the probability of ultrasonic interaction with submillimeter scale internal features. In an immersion scanning method, it is common to use a focused ultrasonic probe to make the beam as small as possible at a given operating frequency. The beam size of a focused probe may be on the order of a few millimeters for the frequency range between 1 MHz and 10 MHz. This means that the ultrasonic interaction with small internal features strongly depends on the ratio between the beam diameter and the size of a feature to be detected. Once again, the minimum detectable feature size depends on the focal diameters of the sending and receiving ultrasonic probes. For example, if an internal feature is 0.1 mm in size and the ultrasonic beam diameter is 2 mm at the focal point, the feature is twenty times smaller and hence the detectability would be low due to a small variation in the ultrasonic signal.

In the case of the aforementioned example, the amplitude of reflected or scattered signal related to the tiny feature would be roughly in the order of ~5% of the amplitude of the incident waves. This 5% change in amplitude would give a low signal-to-noise ratio for the feature signal, meaning that distinguishing the feature from the background noise would be difficult. In many cases, a signal averaging method (either summed or continuous) is used to reduce the background noise, which helps to increase the signal-to-noise ratio for a weak feature signal. Of course, this averaging process prolongs the overall scanning time significantly because each data point needs to be averaged.

Another aspect that should to be considered in ultrasonic scanning is the relationship between the scan step size and the ultrasonic beam diameter. When an aerial scan is performed with a relatively small step size of 0.02 mm (5 times smaller than the exemplary 0.1 mm size feature), no significant changes in ultrasonic signals would occur over the entire 2 mm beam diameter as the beam passes over the 0.1 mm diameter feature because of the large difference between the feature size and the beam diameter. Thus, the scanned image of the 0.1 mm feature would be oversized as well as faint even with a relative small scan step size of 0.02 mm is used. In this case, the small scan step has no meaningful benefit since the ultrasonic beam diameter is too big for the feature.

In addition to the scan step size and the ratio of focused beam diameter versus feature size, the sensitivity of ultrasonic beam to internal features such as pores, cracks, inclusions, lack of fusion or dis-bond can also depend on the wavelength of the ultrasonic waves propagating through the test specimen. In NDT, it is a common practice to select the right frequency ultrasonic probe based on both the minimum detectable feature size and the wavelength of the ultrasonic waves in the medium to be tested. For example, 10 MHz longitudinal mode ultrasonic waves in a typical carbon steel material have about 0.6 mm wavelength. Therefore, the minimum detectable size of internal features with a high confidence in steel would be about 0.3 mm (half of the wavelength). In other words, any internal features that are smaller than 0.3 mm would not appear clear in a C-scan image and would be difficult to interpret.

All three different aspects—the scan step size, beam diameter, and the wavelength—should be considered at the same time to generate a high-quality C-scan image. There are scanning acoustic microscopy systems that can generate microscopic resolution images based on the Rayleigh surface wave propagation theory. However, these systems are designed to examine the surface within a few micrometers deep, rather than for volumetric features. For volumetric internal features, it is necessary to use bulk waves (shear or compressional mode waves) that can penetrate through the material under testing. In addition, these microscopy systems utilize special ultrasonic probes designed to operate at a frequency of several hundreds of megahertz.

Commercially available conventional ultrasonic imaging systems that utilize either phased array or single-element ultrasonic probes in an immersion setup are limited because they do not form a microscopic sized focused beam capable of resolving microscopic internal features. Another method of generating high resolution ultrasonic images uses a laser vibrometer. Such systems can be used to detect ultrasonic waves at a microscopic level. Since the laser beam emitted from a laser vibrometer can be focused down to approximately 10 micrometers in diameter, the laser beam can be scanned over an area using a microscopic scan step. This approach is usually taken with ultrasonic energy that is either induced using a contact probe or a stick-on type piezoelectric plate. Again, the limitation in resolving small microscopic features within a test material derives from the ultrasonic signal source. The ultrasonic wave generated by a contact probe is not focused, rather, it spreads out widely over the entire test area, which makes it difficult to detect the direct ultrasonic response of the internal microscopic feature. Typically, a laser vibrometer ultrasonic imaging system generates high resolution ultrasonic images revealing beam scattering phenomena.

It is apparent that a need exists for a nondestructive testing method whereby ultrasonic bulk waves can be used to generate a microscopic resolution ultrasonic C-scan image.

SUMMARY

A system and methods of nondestructive testing are described herein. The system includes an immersion ultrasonic probe, a laser vibrometer, an immersion tank, and a sample holder. The immersion ultrasonic probe comprises a focusing ultrasonic lens and piezoelectric transducer comprising a reflective mirrored finish. The mirrored finish permits the laser vibrometer to be properly aligned by reflecting off the mirrored finish. According to some embodiments, the piezoelectric transducer and the ultrasonic lens include an orifice and the immersion ultrasonic probe includes an optical path allowing the laser vibrometer to be disposed behind the immersion ultrasonic probe. The immersion ultrasonic probe and a sample are immersed in a fluid contained in an immersion tank and the laser vibrometer is disposed outside of the immersion tank. A tightly focused ultrasonic beam from the immersion ultrasonic probe and a laser beam from the laser vibrometer are both transmitted upon a sample, the laser beam being transmitted through the wall of the immersion tank. Since the ultrasonic beam is tightly focused and the laser beam samples only a small area impinged by the ultrasonic beam, microscopic resolution is obtained.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 10 illustrates interaction of a laser beam and a focused ultrasonic beam with a sample.
FIGS. 22A and 22B show an immersion ultrasonic probe.

DESCRIPTION

It is an object of the present disclosure to provide a scanning non-destructive testing (NDT) method and a system for visualizing the internal features of materials nondestructively and hence extract information about the conditions of internal features, especially interfacial conditions of welded or bonded structures or components in a through-transmission manner. A resistance spot weld made on two sheets of metal plates, for example, can have a mechanically weak corona bond area (i.e. kissing bond) within or around the mechanically strong solid-state fused area.

The disclosure centers on the innovative concept of generating microscopic scale high resolution ultrasonic C-scan images. A laser vibrometer (non-contact detecting of ultrasonic vibration) is used as the receiving probe while a focused immersion ultrasonic probe is placed in an immersion tank as the sending probe in the through-transmission mode. With this setup, the test specimen is simply placed in the water vertically at a location in front of the immersion probe where the ultrasonic beam focuses. In this way, one surface of the test specimen faces the ultrasonic probe and the other surface faces the laser beam that detects only the transmitted waves through the test specimen through the side wall of the immersion tank.

Figure 1:
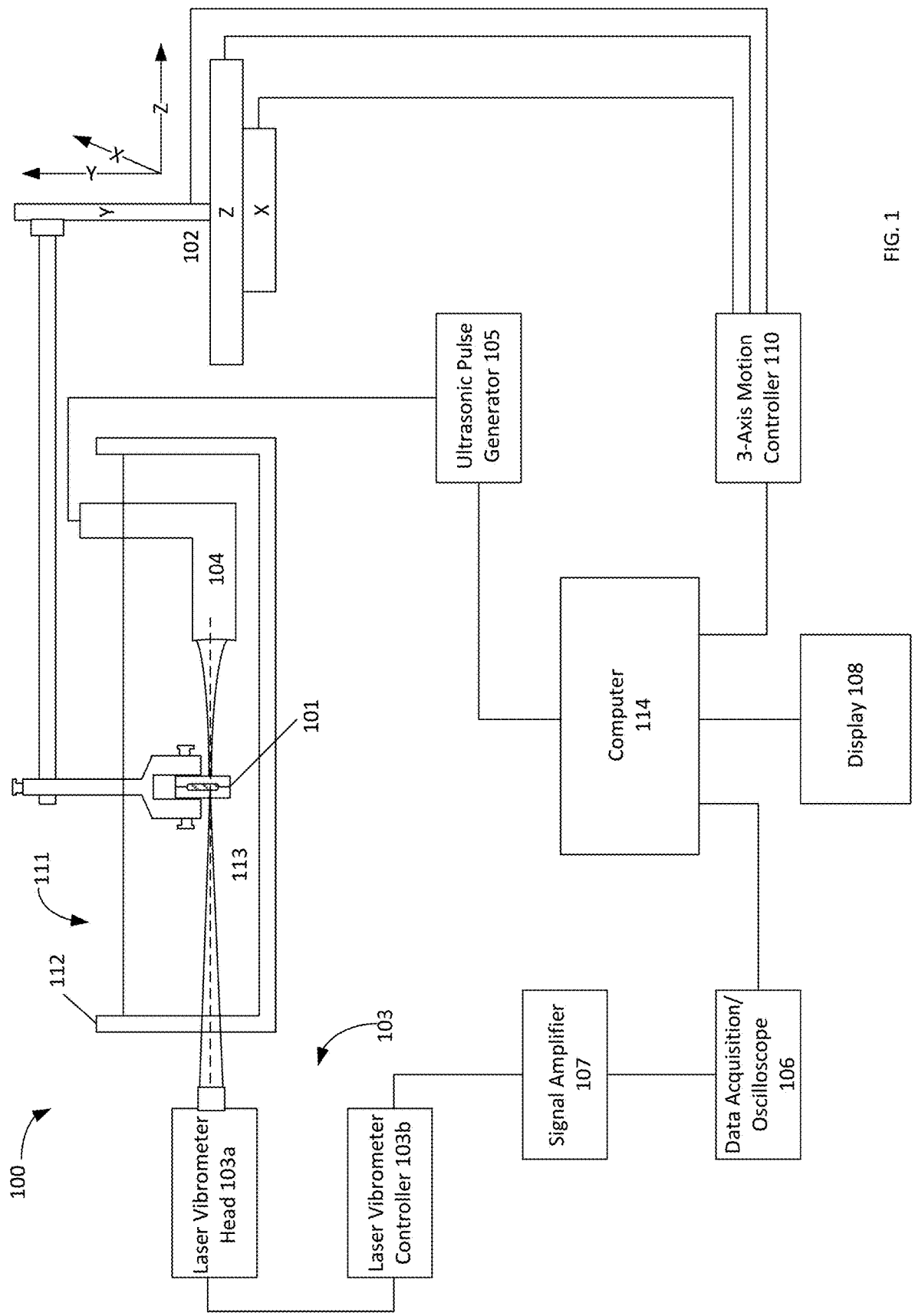
FIG. 1 shows a system for nondestructive testing (NDT).

FIG. 1 shows the system block diagram of an apparatus 100 for obtaining high-resolution non-destructive testing (NDT) images of a test sample 101 (also referred to herein as a "part"). The apparatus comprises a 3-axis mechanical scanner 102 composed of three linear translational stages orthogonally configured to control the position of test sample 101 in the X-, Y-, and Z-axis. The test sample 101 is placed in an immersion tank 111 between the head 103a of a laser vibrometer 103 (located outside of the immersion tank 111) and a focused immersion ultrasonic probe 104 (located within the immersion tank 111). The laser vibrometer head 103a can be placed in air anywhere between 0.1 and 1 meter away from the immersion tank 111 while the focused immersion ultrasonic probe 104 is submerged within the immersion tank 111. The laser beam transmits though the optically transparent side wall 112 of the immersion tank 111. The submersion tank 111 contains a fluid 113, typically water. The fluid may contain additional components, such as corrosion inhibitors or the like.

When the apparatus 100 is activated, a control computer 114 issues a software-generated transistor-transistor logic (TTL) trigger signal to synchronize the movement of the 3-axis scanner 102 with an ultrasonic pulse generator 105 and a data acquisition/oscilloscope unit 106. The 3-axis scanner 102 may be controlled by a 3-axis motion controller 110. As the test sample 101 is scanned over a user defined scan area with a desired scan step, laser light reflected from the sample and indicative of ultrasonic signals at the sample are detected as a form of out-of-plane vibration by the laser vibrometer 103. The detected laser light signals are converted to voltages, which are amplified by a signal amplifier 107 and received by the data acquisition/oscilloscope unit 106, which digitizes and records the signals on the computer's 114 hard drive, generating an ultrasonic A-scan data set for the sample. The variations in the peak-to-peak amplitude of the ultrasonic signal (converted to voltage values) at each position can be displayed in a color-coded format on the computer display 108 as data is being collected, generating a C-scan ultrasonic image.

The computer 114 comprises at least one microprocessor and a storage. The microprocessor may be programmed with instructions for controlling other components of system 100, including the 3-axis scanner and/or the 3-axis motion controller, the laser vibrometer, the ultrasonic pulse generator, and the data acquisition/oscilloscope.

Figure 2:
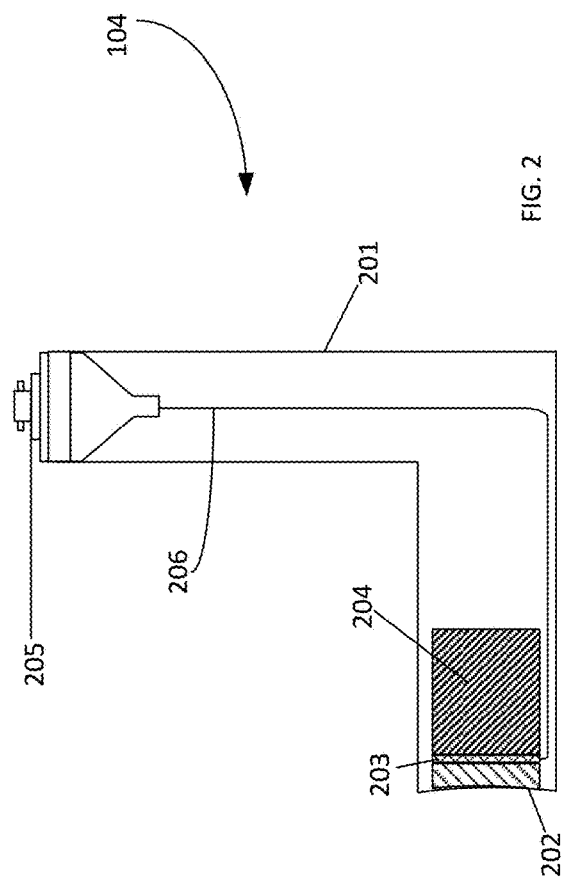
FIG. 2 shows an embodiment of an immersion ultrasonic probe.

FIG. 2 illustrates the focused immersion ultrasonic probe 104 in more detail. The focused immersion ultrasonic probe 104 has a body 201 made of a rigid material, such as brass. Other body materials may be used. The focused immersion ultrasonic probe 104 includes an acoustic lens 202, which may be made of epoxy or other acoustic matching materials known in the art for use in immersion ultrasonic probes. The acoustic lens 202 may be concave. The focused immersion ultrasonic probe 104 also includes a high frequency focused ultrasonic piezoelectric crystal 203. The high frequency ultrasonic piezoelectric crystal 203 may be made of PZT, $LiNbO_3$, PZN-PT and/or PMN-PT and/or other piezoelectric materials known in the art. According to some embodiments, the high frequency ultrasonic piezoelectric crystal 203 may be plated with a mirror-finished material, such as gold. The focused immersion ultrasonic probe 104 also includes a backing material 204 made of a highly attenuative and very dense material, such as a dense polymer or polymer composite. Appropriate backing materials for ultrasonic transducers are known in the art. The focused immersion ultrasonic probe 104 also includes an electrical connector 205 that provides electrical communication to the piezoelectric crystal 203 via a wire 206.

The focused immersion ultrasonic probe 104 provides a tightly focused, high intensity, ultrasonic beam that may be about 10-20 MHz in frequency. The diameter of the ultrasonic beam (measured at −3 dB from the center peak-amplitude) of the immersion ultrasonic probe 104 is approximately 0.25 mm in diameter. The concave shaped acoustic lens 202 is optically transparent so that the laser beam of the vibrometer 103 can penetrate through the lens material and be focused on the surface of the flat mirror-finished gold plated piezoelectric crystal 203 bonded directly to the back of the lens 202.

Figure 3:
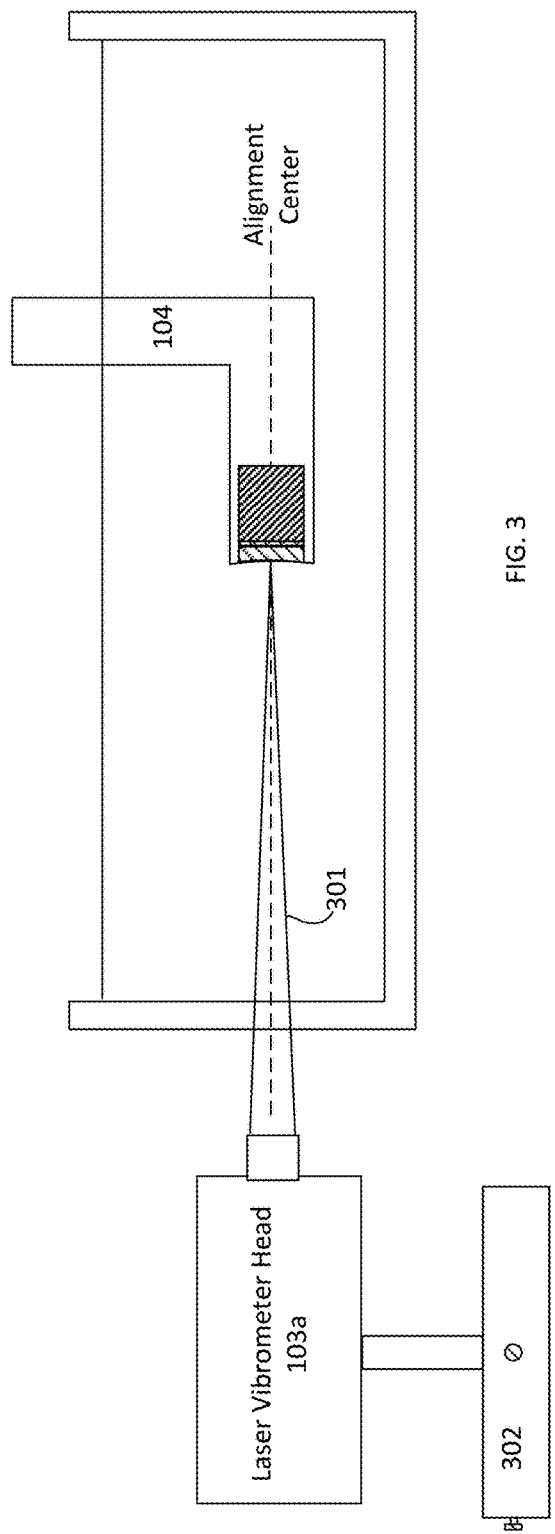
FIG. 3 illustrates alignment of an immersion ultrasonic probe with a laser vibrometer.

FIG. 3 shows an initial alignment process for the head 103a of a laser vibrometer 103 and ultrasonic probe 104 before a test sample 101 is placed between them. Firstly, the focused immersion ultrasonic probe 104 is placed in a desired location in the immersion tank.

The laser beam from the vibrometer 103 is first aligned directly with the focused immersion ultrasonic probe 104 by focusing the laser beam 301 on the center of the probe 104. The focused laser beam 301 emitted from the laser vibrometer head 103a is adjusted to focus the laser beam 301 on the gold coated front surface of the ultrasonic probe's piezoelectric crystal 203 located just behind the optically transparent acoustic lens 202. This adjustment can be done by moving the laser vibrometer head 103a with a 2-axis manual translator 302 while monitoring the output amplitude of the laser detected signals from the laser vibrometer on the data acquisition/oscilloscope unit 106 to detect a maximum amplitude with a minimum background noise while adjusting the positions of laser vibrometer head 103a and the focused immersion ultrasonic probe 104. When the laser beam is properly positioned and focused to the center of the piezoelectric crystal 203, the amplitude of the output signal has a maximum value with a minimum background noise.

Once the laser vibrometer 103 and the focused immersion ultrasonic probe 104 are properly aligned, the test sample 101 can be connected to the 3-axis mechanical scanner 102 and submerged in the water at the focal point of the focused immersion ultrasonic probe 104 (~30 mm in front of the probe), as shown in FIG. 1. The laser beam 301 can be refocused on the opposite surface of the test sample 101. The focal diameter of the laser beam can be as small as 10 micrometers meaning that the active detection area of the ultrasonic vibration is equally as small as 10 micrometers. In other words, only 10 micrometers (corresponding to the center peak amplitude of the ultrasonic beam) of the 250-micrometer ultrasonic beam diameter is actively detected by the laser vibrometer 103. In this way, the signal-to-noise ratio of the laser detected vibration can be maximized, eliminating need for signal averaging and reducing the scan time significantly. Both the laser beam 301 and the focused immersion ultrasonic probe 104 are kept stationary while the test sample 101 is moved using the 3-axis mechanical scanner 102.

Figure 4A:
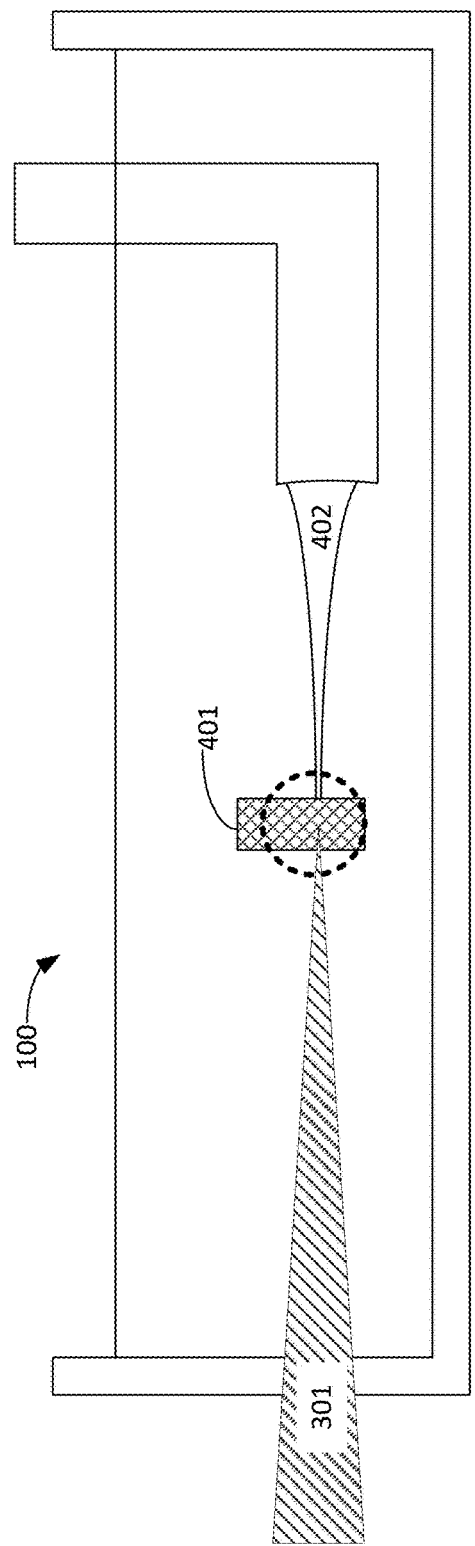
FIGS. 4A and 4B show NDT of a sample.
Figure 4B:
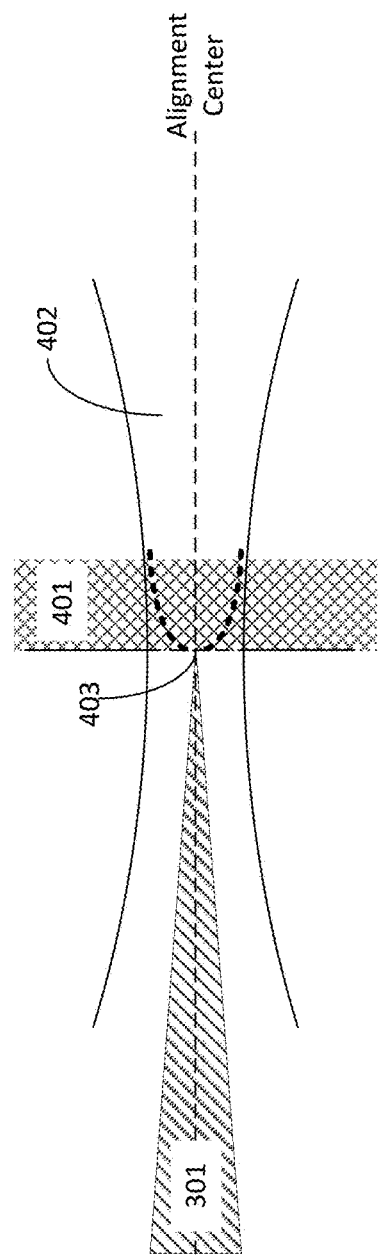

FIGS. 4A and 4B illustrate the interaction of the focused laser beam with a focused ultrasonic beam when a test sample 401 made of a homogeneous isotropic solid material (e.g. stainless steel) is placed in the apparatus 100. The focal position of the focused ultrasonic beam is positioned to be at the surface of the test specimen on which the laser beam 301 is focused as shown in the close-up view FIG. 4B. At this point, the interaction of the laser beam 301 with the ultrasonic beam 402 is precisely at the peak amplitude 403 of the ultrasonic beam 402. Since the focal size of the laser beam 301 is approximately 10 micrometers, the interactive area between the laser beam and the ultrasonic beam is approximately 10 micrometers. If ultrasonic beam diffraction, scattering, or reflection occurs due to the material's internal conditions during scanning, variations in the amplitude of the laser are detected because the peak amplitude position 403 deviates from the center peak position or total amount of through transmission energy changes. The final C-scan image reveals these amplitude changes in a color-coded format.

An ultrasonic A-scan data set can be collected in continuous or point-by-point scan mode. Advantages of the continuous scan mode is that it minimizes mechanical vibrations caused by the scanner and it reduces scan time. The continuous scan mode is based on a simple arithmetic calculation between the trigger signal repetition rate and the scan step size along the primary axis (e.g., the X-axis in FIG. 1) of the scanner. The user can define the geometric area (Length×Width) to be scanned and can also define a resolution. A computer algorithm can adjust the scan speed and step size to provide the proper scan speed to coordinate the desired resolution with the trigger rate of the ultrasonic probe. For example, assume the user wants to scan a 1 cm×1 cm sample at a resolution of 10 micrometers. Also, assume that the system triggers ultrasonic signals 100 times per second. The system may step the sample in 10 micrometer increments at a scan rate 1 mm per second along the X-axis, thereby providing 1 ultrasonic pulse for every 10 micrometers, yielding a resolution of 10 micrometers. Once the defined scan length of 1 cm is reached (after 10 seconds), the scanner simply steps the sample 10 micrometers in the secondary axis of scanner (e.g., the Y-axis in FIG. 1) and the scan repeats in the return (−X) direction. The coordinate data for each scan position is retrieved from the scanner controller after each trigger. According to some embodiments, the user may be able to select additional parameters, such as scan speed, or the like.

During the acquisition of A-scan data, the computer can calculate and display a C-scan image on the display in real time. Also, the A-scan data is stored on a storage, such as a hard drive or memory and is available for post processing. For example, a user may wish to apply filtering, gating or windowing functions to the A-scan data, to reveal microscopic features that may be obscured by larger features present in the total A-scan data set.

Figure 5:
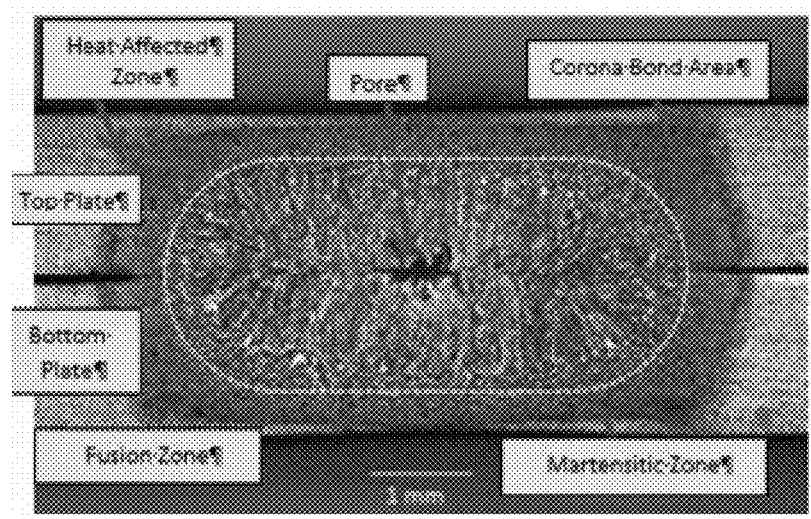
FIG. 5 shows a cross section of a weld.

FIG. 5 illustrates a cross-sectional metallographic image of a typical resistance spot weld. Both top and bottom plates are shown with a fused zone (dotted oval area) in the middle. This fused zone is called the weld nugget and has martensitic microstructure with a distinctive dendrite textured pattern. This fused zone is responsible for the mechanical strength of the weld. Thus, it may be important to know the size and shape of the martensitic zone when a destructive metallographic examination is made. In this cross-sectional image, a pore (air pocket) is shown in the center interfacial section. Such pores commonly occur during the melting and re-solidification process of the resistance spot welding. Determining the presence of such pores is also an important goal of NDT. In the image, both the corona bond area and heat affected zone are also shown around the perimeter of fusion zone. No indication of formation of martensitic microstructure in the corona bond area and the heat affected zone. A further goal of NDT is to determine the extent of martensitic microstructure in the corona bond and the heat affected zone.

Figure 6:
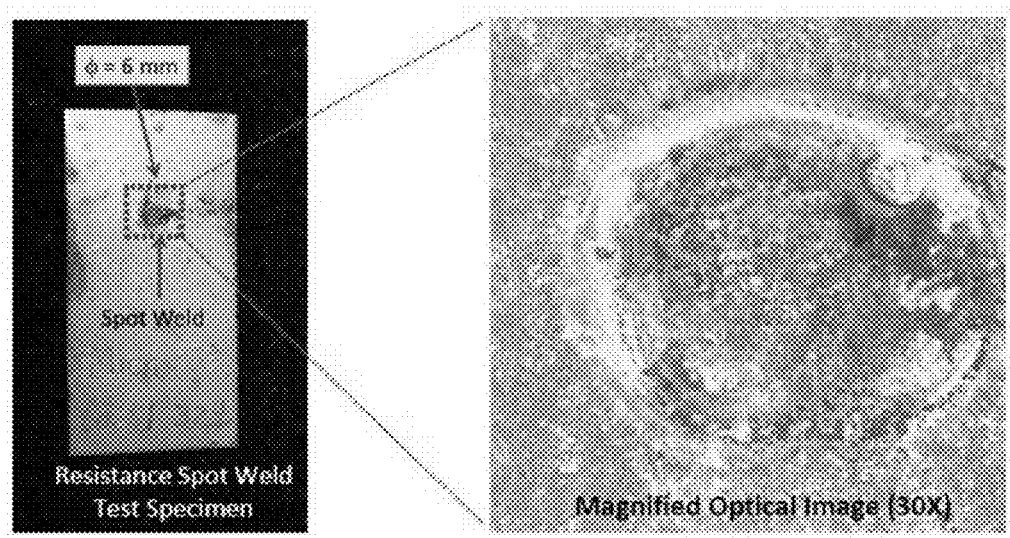
FIG. 6 shows a photograph of a weld.

FIG. 6 shows two optical images of a resistance spot welded test sample made of two sheets of 0.7 mm thick carbon steel. The size of the spot weld on the sample is approximately 6 mm in diameter and the close-up image of the spot weld on the right shows the detailed surface condition of the weld. For a system demonstration purpose, the opposite surface of the test specimen (not shown in the figure) was lapped and polished to a 3-micrometer finish so that the laser beam is reflected with minimum optical scattering.

Figure 7:
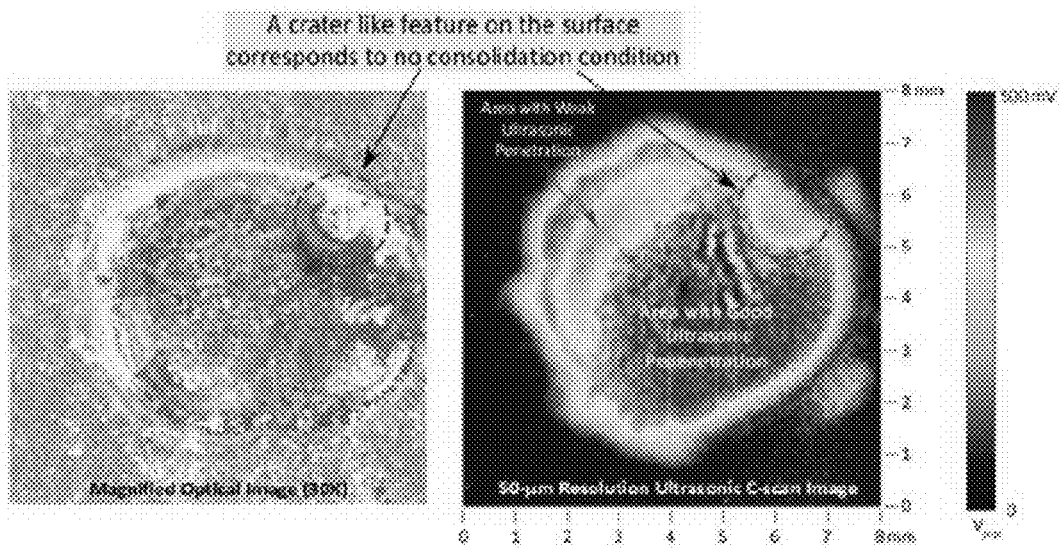
FIG. 7 shows a photograph and a C-scan image of a weld.

Referring to FIG. 7, both an optical image of the spot weld test specimen and a through-transmission ultrasonic C-scan image collected using system 100 are shown together for comparison. The ultrasonic image was collected over an area of 8 mm×8 mm with a 50-micrometer spatial resolution. The crater like feature on the upper right hand side of the optical image is identified as the corresponding half-circle shape in the ultrasonic image, indicating lack of fusion. The color-coded bar (blue to red) represents the peak-to-peak voltage range of the laser detected through-transmission signals of the scanned area. The orange and red colored region indicates a strong ultrasonic penetration, which potentially implies a good interfacial contact condition.

Figure 8:
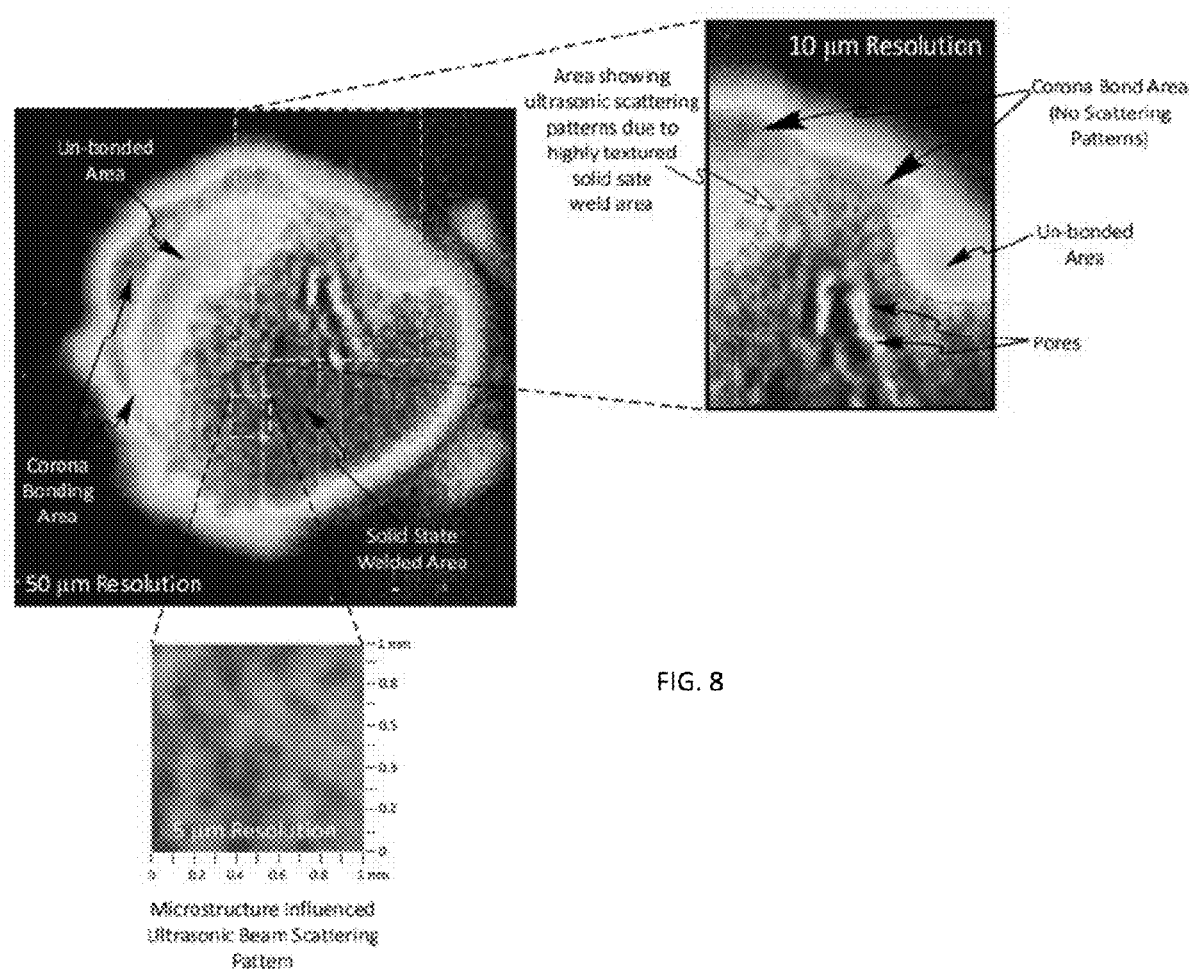
FIG. 8 shows a C-scan image of a weld.

FIG. 8 shows a 50-micrometer resolution ultrasonic image along with a 10-micrometer resolution image of the section of the weld at which a cluster of micro-voids are formed (the larger dotted rectangular area) and a 5 micrometer resolution image of 1 mm×1 mm area scanned over the fusion zone. The 10-micrometer resolution image on the right side of the 50-micrometer resolution image shows a detailed difference between the fusion zone and the corona bond area. Within the fusion zone, there is a spotty pattern of repeated darker red and lighter orange colored areas, while the outer perimeter section of the upper part of the weld shows a relatively smooth distribution of orange and yellow color coded area with no distinctive repeated spotty patterns. The repeated spotty pattern can be clearly seen in the 5-micrometer resolution image of the 1 mm×1 mm scanned area in the middle section of the fusion zone. This spotty pattern is the result of the beam steering phenomenon caused by the highly anisotropic martensitic microstructure in the solid-state fusion area. From these images, it can be concluded that the microscopic level of high resolution imaging method can reveal not only the difference between the bonded and un-bonded areas, but it also helps to distinguish the corona bond area from the fusion zone.

Figure 9:
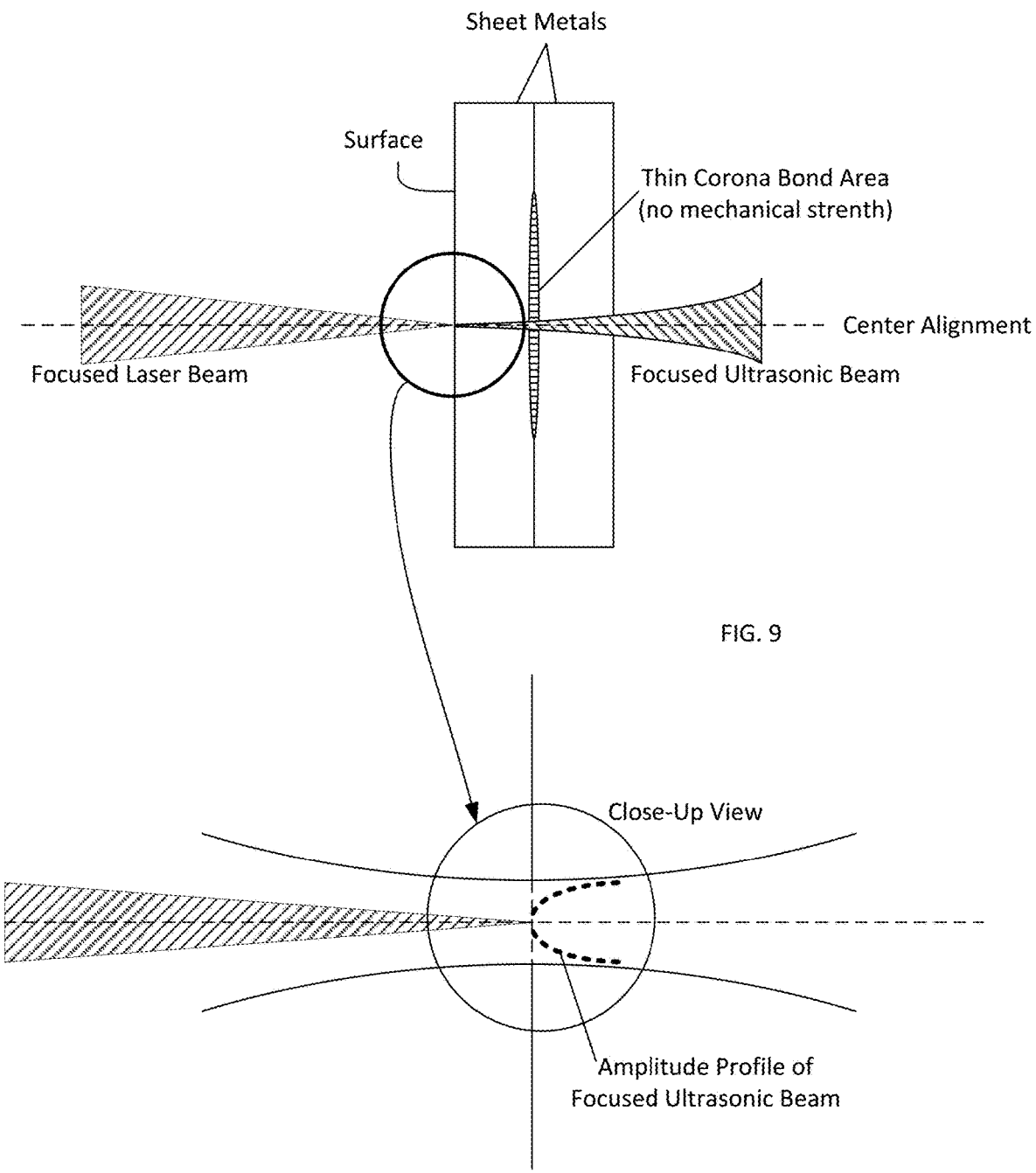
FIG. 9 illustrates interaction of a laser beam and a focused ultrasonic beam with a sample.

FIG. 9 shows a 100% corona bonded interfacial condition in which ultrasonic beam can penetrate through the interface of the two metal sheets as they are well bonded together. When a raster scan is performed over an area, the final ultrasonic C-scan image reveals the bonded area and the un-bonded area. The corona bond has a uniformly distributed weld nugget image with no distinctive patterns of beam scattering because there is no physical phenomenon that can cause beam steering effect over the entire corona bond area.

FIG. 10 illustrates a resistance spot weld with a fused zone in the middle. When focused ultrasonic beam travels through the elastically highly anisotropic martensitic microstructure zone, the beam is steered (diffracted) away from the centerline causing the laser beam to interact with the slightly lower amplitude part of the beam as illustrated in the close-up view diagrams. This beam steering effect repeats back and forth over a short distance depending on the dimensions and orientation of dendrites in the fusion zone. When an aerial scan is performed at a spatial resolution that is equivalent or smaller than the microstructural length scale, the repeating pattern of beam scattering phenomena would show up in the C-scan image. From this spotty beam scattering pattern, the fusion zone can be distinguished qualitatively from the non-scattering corona bond area.

Figure 11:
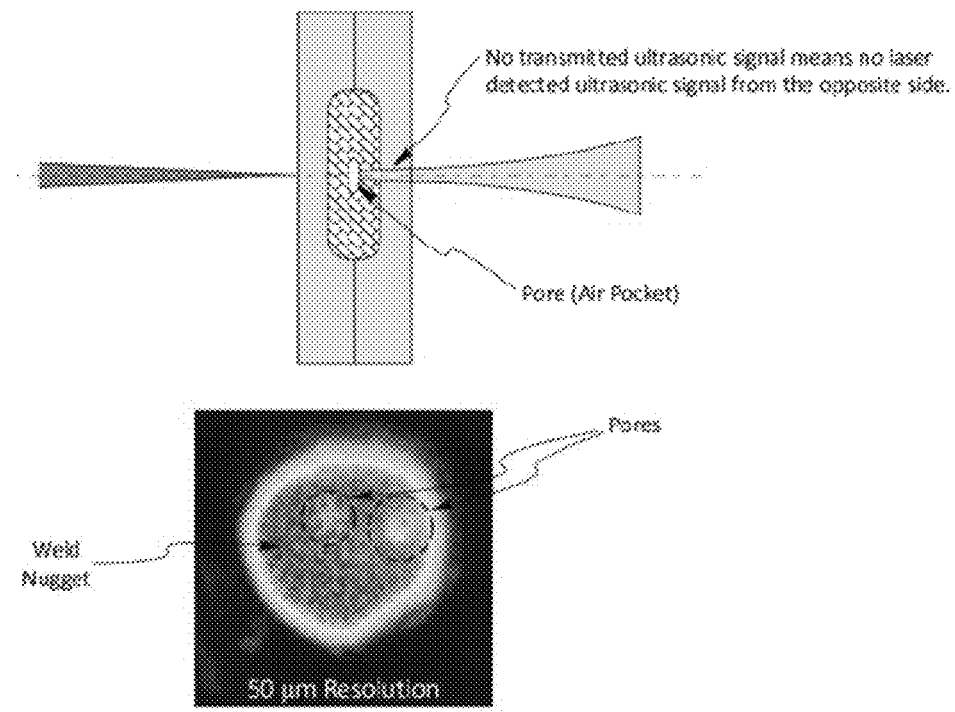
FIG. 11 shows a C-scan image of a weld.

FIG. 11 illustrates a pore (air pocket) in the weld. In this case, the incident ultrasonic beam is blocked by the pore due to a strong acoustical impedance mismatch between the weld material and the air. An exemplary C-scan image of a resistance spot weld test sample taken at 50-micrometer spatial resolution reveals existence of pores in the weld.

Figure 12:
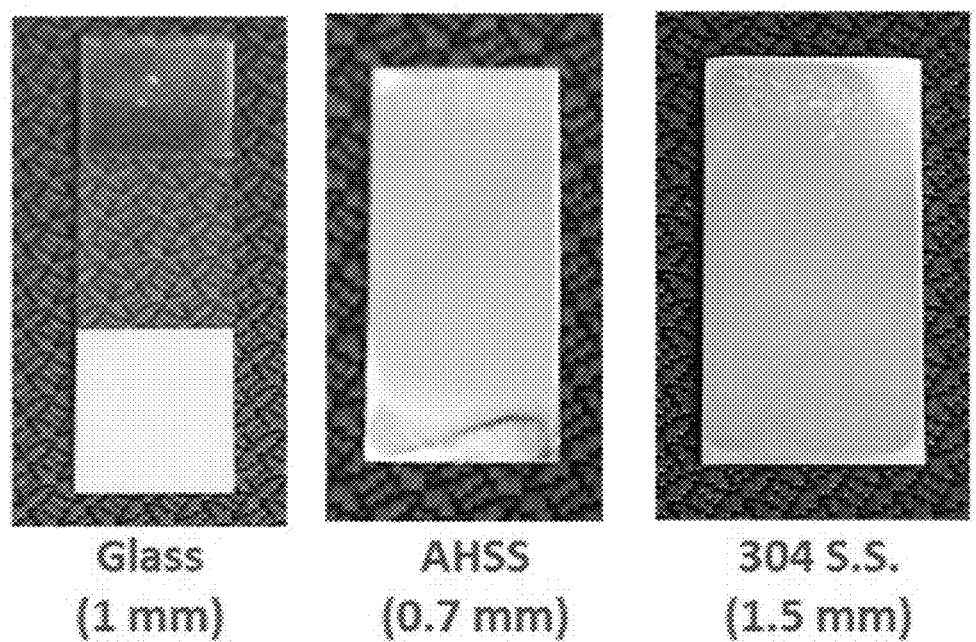
FIG. 12 shows samples for imaging using a NDT apparatus.
Figure 13:
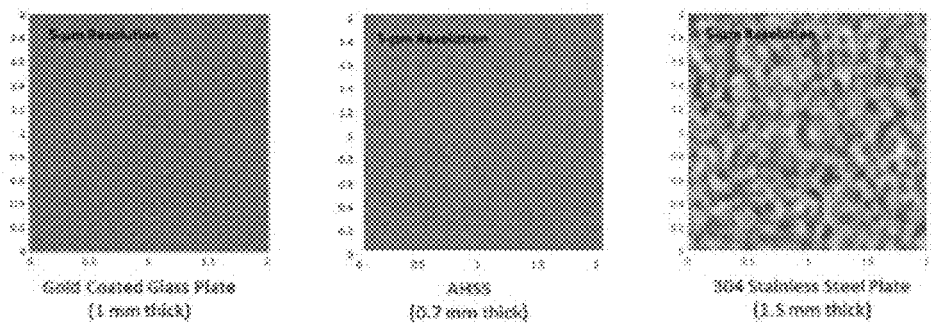
FIG. 13 shows C-scan images of materials.

FIG. 12 depicts reference samples, gold coated 1-mm thick glass sheet, 0.7-mm thick advanced high strength automotive grade steel sheet and 1.5-mm 304 stainless steel. FIG. 13 depicts ultrasonic amplitude C-scan images of reference samples described in FIG. 12 in a through transmission set up. These images were collected with a 5-micrometer spatial resolution. Both C-scan images of gold-coated glass (amorphous) and automotive grade steel (average grain of 5-micrometer) show no distinctive ultrasonic scattering pattern. However, discrete grains are apparent in the scan of the 304 stainless steel plate, which has an average grain size of 200 micrometers.

Figure 14:
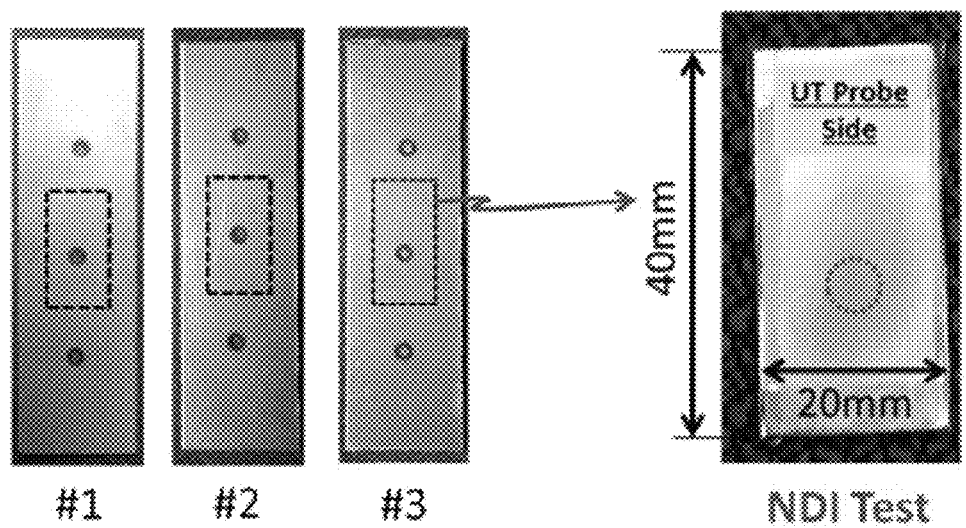
FIG. 14 shows samples for imaging using a NDT apparatus.

FIG. 14 depicts three resistance spot welded test samples used in the present investigation with the claimed micro-resolution ultrasonic imaging system. These samples were made of two sheets of 1.2-mm thick 780 dual phase automotive grade advanced high strength steel. Welding parameters used for the three test sample were set differently to create different welded area in the samples. All three welds made on each samples were made under the same welding parameters set for each test sample. The middle weld indicated by rectangular dotted line box of each sample was cut and prepared for nondestructive testing. Both surfaces of each sample were lapped polished to a 3-micrometer finish with a diamond lapping compound. There were no visible indentation marks on the surfaces and any surface effects on the ultrasonic signals and laser beam were illuminated for fair comparison of ultrasonic imaging results of each test sample.

Figure 15:
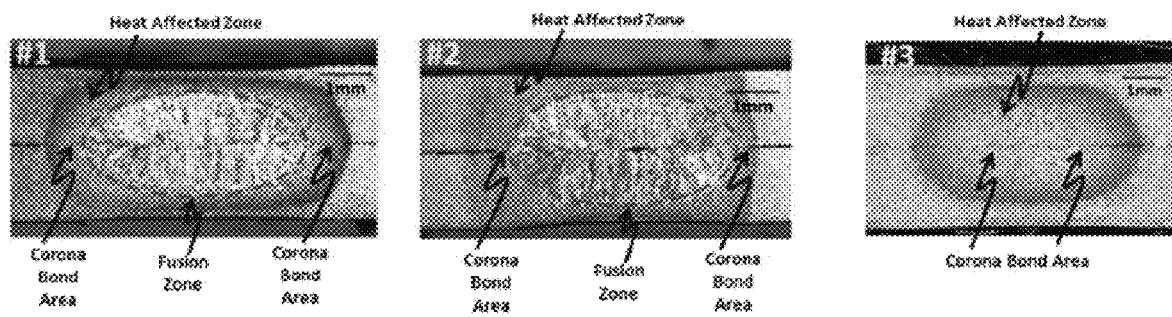
FIG. 15 shows cross sections of various welds.

FIG. 15 depicts side cross-sectional metallurgical images of the welds on the test samples shown in FIG. 14. Images of sample #1 and #2 clearly depict the fusion zones with martensitic microstructures indicated by dotted circles, outer corona bond area at the interface of the two sheets and the surrounding heat affected zone. On the contrary, the image of sample #3 depicts no fusion zone in the midsection of the weld, but only visible for corona bond area at the interface across the entire and surrounding heat affected zone, which is commonly referred as a stuck weld with no mechanical strength at the interface.

Figure 16:
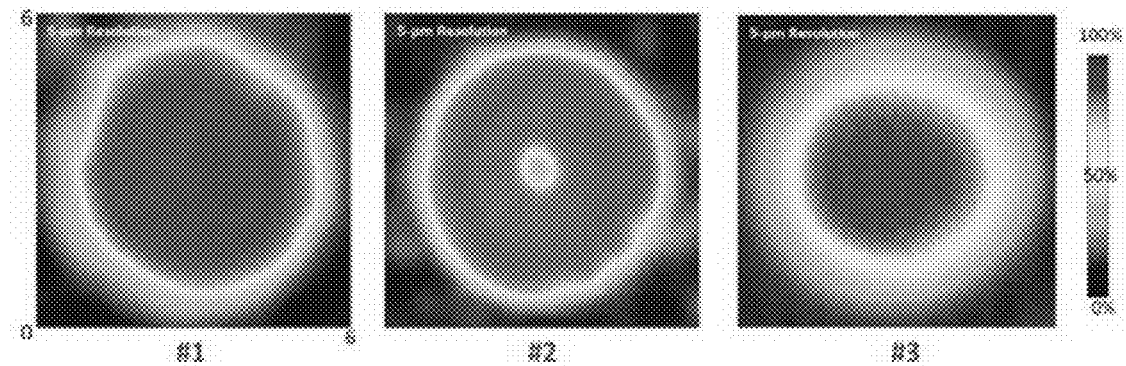
FIG. 16 shows C-scan images.

FIG. 16 shows ultrasonic amplitude C-scan images of the three resistance spot weld test samples shown in FIG. 14 collected using a prior art traditional immersed focused ultrasonic receiving probe. The traditional through-transmission method uses a first immersed probe as a source of a highly focused ultrasonic beam and a second ultrasonic probe located on the opposite side of the test sample to detect ultrasonic energy transmitted through the samples. The color code chart on the right side of the images shows ultrasonic energy transmission through the samples. Red color indicates 100% transmission while blue color indicates 0% transmission. Based on the color code chart, the perimeter of the welded area on each test sample is at the boundary where yellow and light blue colors meet, where about 50% (−6 dB) of the energy transmits though the samples. In the case of sample #2, there is a pore in the middle of the welded area. From these images, it is difficult to distinguish the difference between the fusion zone and the corona bond area. Thus, the traditional immersed ultrasonic method cannot distinguish an adequately fused weld and an inadequate corona bonded weld.

Figure 17:
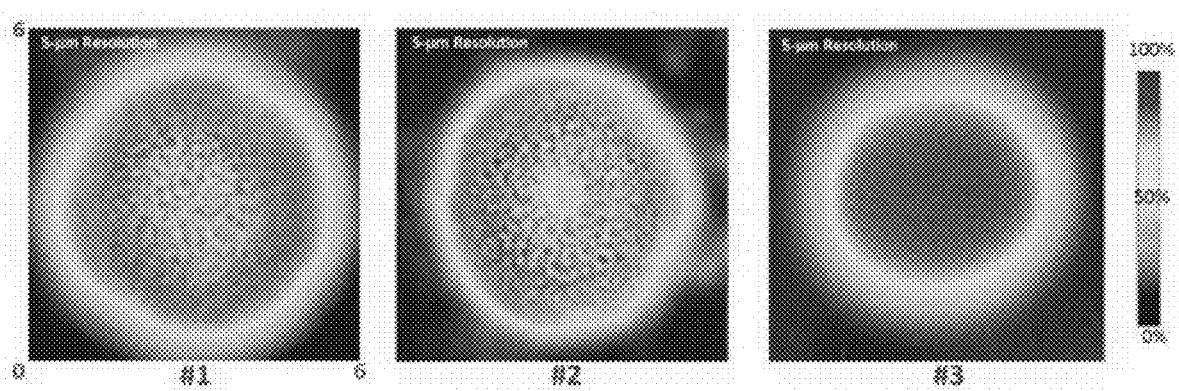
FIG. 17 shows C-scan images.

FIG. 17 shows 5-micrometer resolution ultrasonic C-scan images of the three resistance spot welds samples depicted in FIG. 14 collected using the disclosed system 100. The images of samples #1 and #2 shows ultrasonic scattering patterns across the welded area, while the image of sample #3 shows no such scattering pattern, indicating that sample #3 does not contain an adequate fusion zone. From comparisons of these images, stuck welds can be discriminated from sound welds containing fusion zones.

Figure 18:
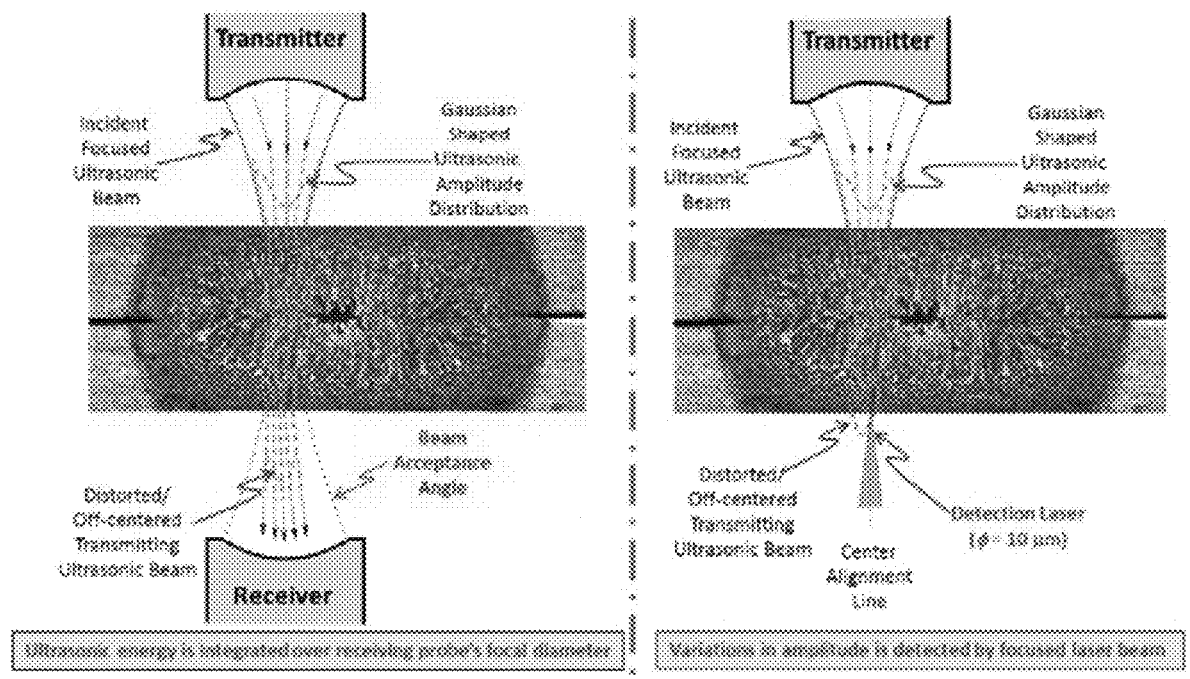
FIG. 18 shows diffraction of an ultrasonic beam through a weld.

FIG. 18 shows two schematic diagrams showing the difference in detection of a transmitted ultrasonic beam (traditional method v. using system 100) through a highly textured martensitic fusion zone of a resistance spot weld. Using the traditional method, shown on the left, the transmitted ultrasonic beam is integrated over the entire diameter of the receiving probe, thereby obscuring any diffraction caused by the textured martensitic fusion zone. Unless there is a large deviation from the center line beyond the probes acceptance angle, any small scattering effect of the transmitted beam is not detectable. On the contrary, the same amount of beam scatter caused by the highly textured fusion zone can be detected using the focused laser beam of system 100, since the focused laser beam only sample a few micrometers in diameter on the surface of part. As the part is raster scanned, small variations in the amplitude appear as a scattering pattern in the final C-scan image.

Figure 19:
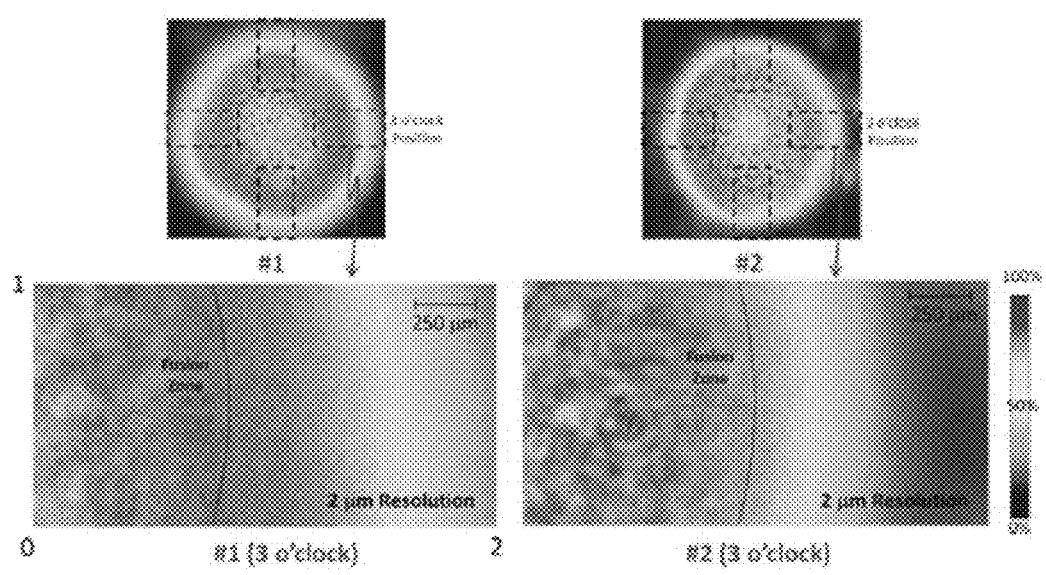
FIG. 19 shows C-scan images.

FIG. 19 depicts 2-micrometer spatial resolution images scanned over an area of 1 mm by 2 mm at the 3-o'clock positions of test samples #1 and #2 (FIG. 14). Based on the close examination of ultrasonic scattering pattern and the corresponding A-scan data, the boundary between the fusion zone and corona bond area is defined (as indicated by dotted curved lines in each 2-micrometer resolution image). The same examination process was performed with additional 2-micrometer resolution images obtained at the 12-, 9- and 6-o'clock positions to define the diameter of the fusion zone of each test sample.

Figure 20:
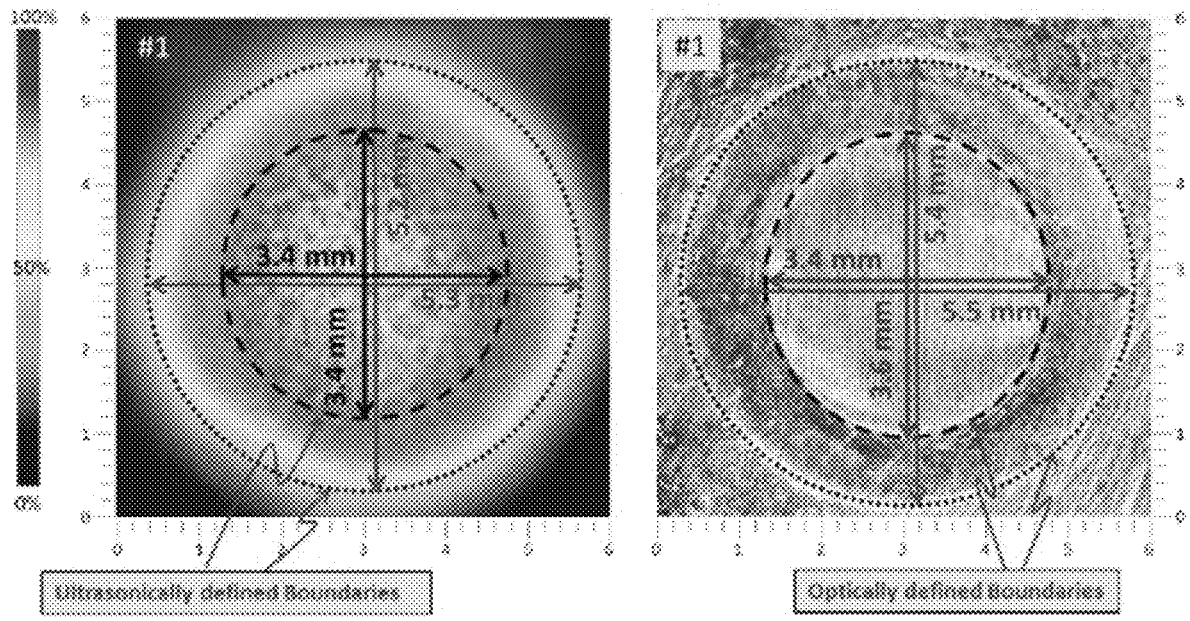
FIG. 20 shows a C-scan image and an optical image of a weld.

FIG. 20 depicts a 5-micrometer resolution ultrasonic C-scan image of test sample #1 (FIG. 14) and its optical image taken after horizontal sectioning to reveal the fusion zone and corona bond area. Average diameters of the fusion zone and corona bond area were determined to be 3.40 mm and 5.25 mm, respectively, based on the ultrasonic C-scan image, while they were optically determined to be 3.50 mm and 5.45 mm, respectively. The differences between the two measurements are 0.1 mm for the fusion zone and 0.2 mm for the corona bond area.

Figure 21:
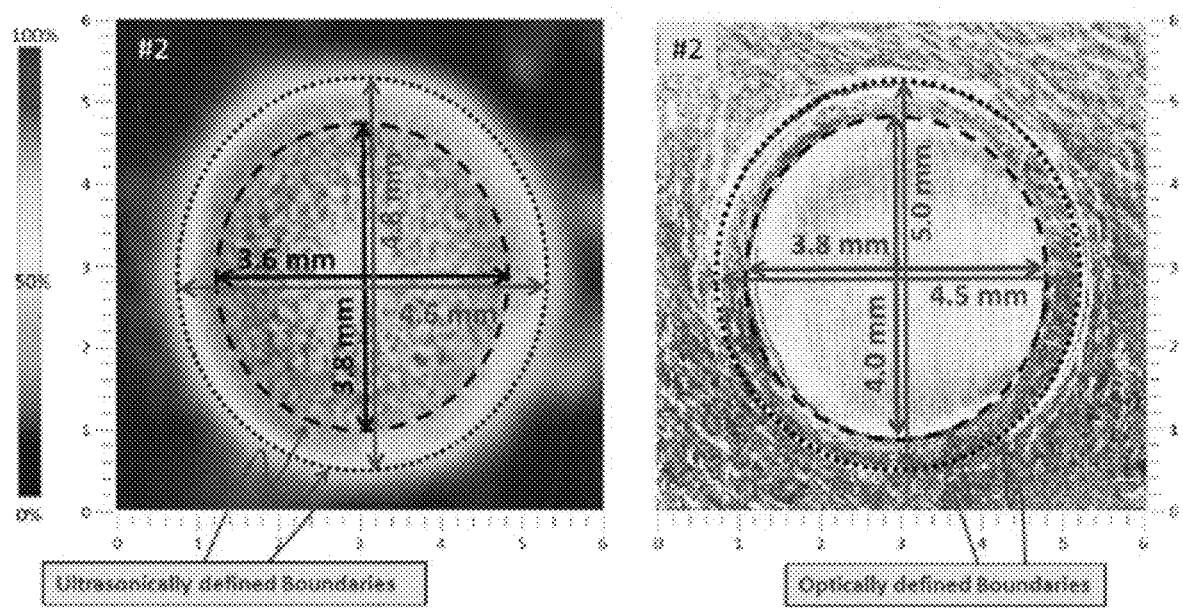
FIG. 21 shows a C-scan image and an optical image of a weld.

FIG. 21 depicts a 5-micrometer resolution ultrasonic C-scan image of test sample #2 and its optical image taken after horizontal sectioning to reveal the fusion zone and corona bond area. The measurements on the C-scan image were made as explained previously. The measurements on the optical image were made visually under a microscope equipped with distance measuring cursors. In this case, the weld appears to be an ellipse unlike the sample #1 case, which is more circular in shape. For the fusion zone, the longer vertical axis was determined to be 3.8 mm based on the C-scan image, while it was optically determined to be 4.0 mm. The shorter horizontal axis was determined to be 3.6 mm and 3.8 mm based on the C-scan and optical images, respectively. For the corona bond area, the longer vertical axis was determined to be 4.8 mm based on the C-scan image, while it was optically determined to be 5.0 mm. The shorter horizontal axis was determined to be 4.6 mm and 4.5 mm based on the C-scan and optical images, respectively. Overall, the differences in the measurements are less than 0.2 mm.

FIGS. 22A and 22B illustrate an alternative embodiment of a focused immersion ultrasonic probe 2200 that can be used in system 100 (FIG. 1). The probe 2200 is like the probe 104 described with respect to FIG. 2, except in probe 2200, the acoustic lens 2202 and the high frequency focused ultrasonic piezoelectric crystal 2203 include an orifice 2204 at the center. Probe 2200 also includes a tube 2205 to provide a path for a laser beam of a laser vibrometer, which may be positioned behind probe 2200. The tube 2205 may be made of a rigid material, such as brass, for example. By positioning the laser vibrometer behind the probe 2200, the laser can be aligned through the body of the probe 2200 and focused on the measurement sample. The diameter of the tube 2205 and the orifice 2204 may be optimized based on experimental conditions.

While the invention herein disclosed has been described in terms of specific embodiments and applications thereof, numerous modifications and variations could be made thereto by those skilled in the art without departing from the scope of the invention set forth in the claims.

What is claimed is:

1. A non-destructive testing (NDT) apparatus, comprising:
   an immersion ultrasonic probe configured within an immersion tank and configured to generate an ultrasonic beam having a beam focal diameter of less than 300 micrometers measured at −3 dB from center peak-amplitude,
   a laser vibrometer configured outside the immersion tank, and
   a sample holder configured to hold a sample within the immersion tank,
   a scanner operatively connected to the sample holder and configured to move the sample over a user-defined scan area, wherein
   the sample holder, immersion ultrasonic probe, and laser vibrometer are aligned so that laser light from the laser vibrometer impinges a first side of the sample at a first position and the ultrasonic beam from the immersion ultrasonic probe impinges a second side of the sample at a second position directly opposite of the first position, and
   a processor configured to synchronize the scanner with data acquired by the laser vibrometer to generate an image of the sample.

2. The NDT apparatus of claim 1, wherein the immersion ultrasonic probe comprises a piezoelectric transducer with a reflective mirror finish.

3. The NDT apparatus of claim 2, wherein the reflective mirror finish comprises gold.

4. The NDT apparatus of claim 1, wherein the scanner is a 3-axis scanner.

5. The NDT apparatus of claim 4, wherein the processor is configured to control the immersion ultrasonic probe and laser vibrometer.

6. The NDT apparatus of claim 1, wherein the processor is configured to control the laser vibrometer.

7. The NDT apparatus of claim 4, wherein the processor is configured to receive digital signals derived from the laser vibrometer.

8. The NDT apparatus of claim 1, wherein the ultrasonic beam from the immersion ultrasonic probe has a frequency of 5 MHz to 30 MHz.

9. The NDT apparatus of claim 1, wherein the ultrasonic beam from the immersion ultrasonic probe has a frequency at least 10 MHz.

10. The NDT apparatus of claim 4, wherein the 3-axis scanner is configured to receive input testing parameters.

11. The NDT apparatus of claim 10, wherein the inputted testing parameters relate to resolution.

* * * * *